Jan. 5, 1932. F. CARROLL ET AL 1,839,198
SAFETY VALVE FOR GAS OR OIL WELLS
Filed Sept. 16, 1929
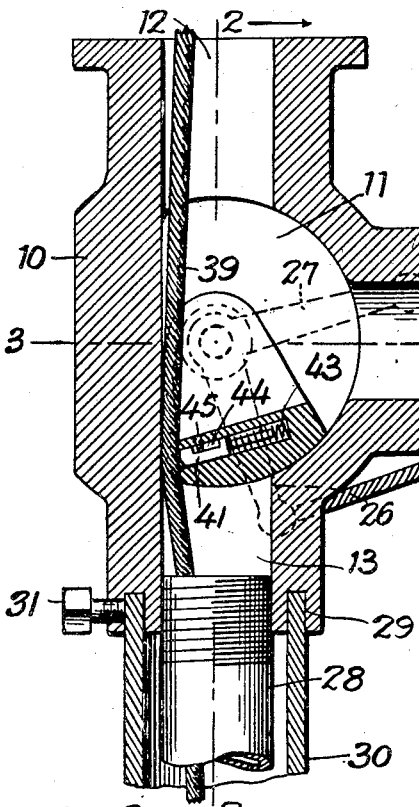
Fig. 1.
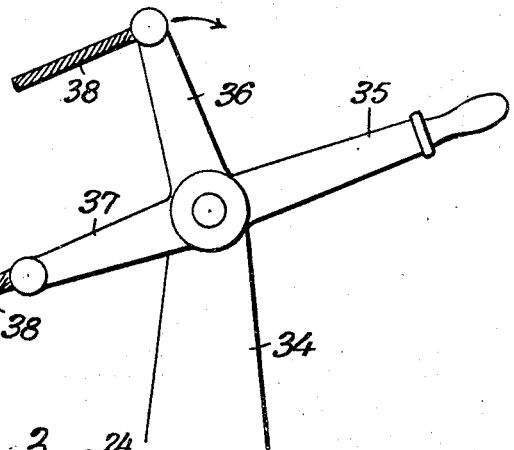
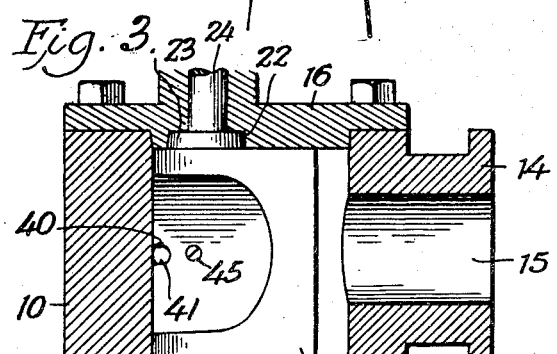
Fig. 3.
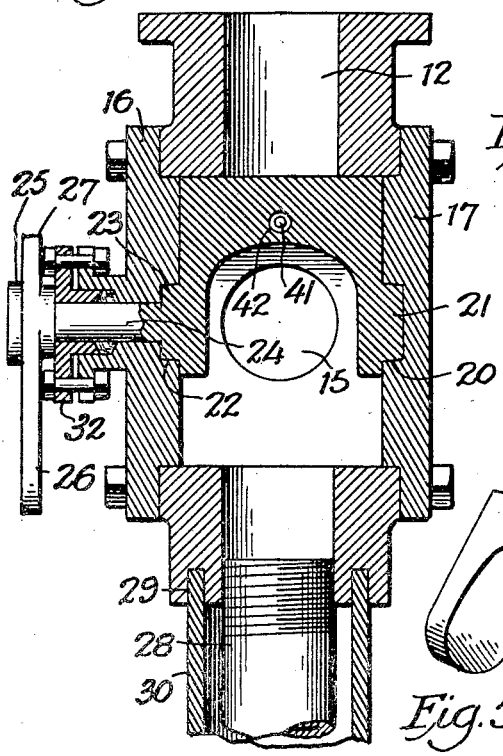
Fig. 2.
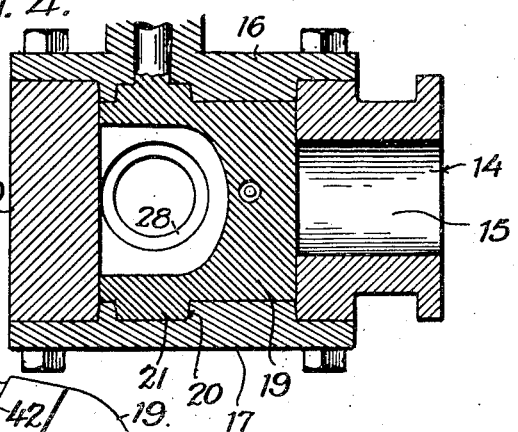
Fig. 4.
Fig. 5.
INVENTOR.
Frank Carroll,
Wilbur Coss,
BY
A. Gates Dowell
ATTORNEY.

Patented Jan. 5, 1932

1,839,198

UNITED STATES PATENT OFFICE

FRANK CARROLL, OF CLAIRTON, AND WILBUR COSS, OF WILSON, PENNSYLVANIA

SAFETY VALVE FOR GAS OR OIL WELLS

Application filed September 16, 1929. Serial No. 393,042.

This invention relates to safety valves for gas or oil wells and it is an object of the invention to provide a simple, durable and reliable device of this character adapted to be used in the drilling of wells in gas and oil fields, where the oil or gas suddenly begins to flow and which sometimes takes fire.

It is a further object of the invention to provide means quickly operable from a distance without endangering the life of the operator, for stopping the discharge from the well or for diverting it into a pipe line.

A further object is to provide a valve which will not interfere with the drilling operation; all as will be hereinafter more particularly described.

The invention will first be hereinafter more particularly described with reference to the accompanying drawings, in which Fig. 1 is a sectional part elevation view illustrating one application of the invention;

Fig. 2, a section on the line 2—2 of Fig. 1;

Fig. 3, a section on the line 3—3 of Fig. 1;

Fig. 4 is a section similar to Fig. 3 but with the valve in a different position; and Fig. 5 is a perspective of the valve.

In the drawings, wherein similar reference characters indicate similar parts, 10 indicates an elongated valve casing provided with a substantially semi-cylindrical valve chamber 11 and aligned passages 12 and 13 communicating therewith. The valve body is also provided with a lateral extension 14 in which is formed a horizontal passage 15 disposed at right angles to the passages 12 and 13. The valve casing is provided with movable side plates 16 and 17 secured in position by bolts or other fastening means, said side plates serving as bearings for and being closely engaged by a valve 19. The side plate 17 has a circular depression 20 for a boss 21 on the valve and the other side plate being provided with a depression 22 for the reception of a boss 23, such boss having an extension or valve operating arm 24 which projects through the side plate 16 and is provided at its extremity with an operating lever 25 having arms 26 and 27, by means of which the valve may be operated.

The lower end of the valve casing is internally threaded for the reception of a pipe 28 and is provided with an annular recess 29 for the reception of a concentric pipe 30 adapted to be held in position by means of set screws 31.

The upper end of the valve casing is provided with a flange to which a cap (not shown) of any desired character may be bolted or otherwise secured. Similarly, the lateral extension 14 of the valve casing, which is provided with the horizontal passage 15, is also provided with an external flange by means of which connection may be made between the valve and the pipe line (not shown).

The valve 19 is substantially yoke shaped as will be observed from Fig. 5, the arms of the yoke forming supports for the bosses described hereinbefore and affording an unobstructed passage through the casing when the valve is in the position shown in Fig. 4. In order to prevent the escape of oil or gas around the operating arm of the valve, a suitable packing gland 32 may be provided and which is of conventional construction.

In order to permit the valve to be operated from a distance, we provide a suitable support 34 which may be located at a distance of for example 100 yards from the valve and upon this support is mounted an operating lever 35 which has crank arms 36 and 37 connected by cables 38 with the arms of the bell crank lever 25 so that when the lever 35 is operated, the valve may be moved to three positions through an angle slightly less than a half circle.

With the valve in the position shown in Fig. 1, the passage 13 is closed and discharge from the well is prevented, while if the valve is moved slightly it will be brought into position over the passage 15, and the longitudinal passage through the valve casing will be unobstructed. If the valve is moved still further to a position opposite that shown in Fig. 1 it will only close the passage 12 and establish communication between the passages 13 and 15 or between the well and the pipe line. Normally when the drilling operation is being performed, the valve will be disposed in position to close the passage 15, and in such position the drilling tools suspended by a cable 39 may be lowered or raised through the valve casing, the valve in no way obstructing this operation. However, when the valve is in the last mentioned position if a gusher is encountered the valve may be quickly moved to the position desired, either shutting off the flow or diverting it through the pipe line.

In order to permit the valve to be closed so that flow therethrough is prevented even when the cable 39 is disposed within the casing, a transverse recess 40 is formed in the valve 19 in order to close this recess when the cable is not located therein, a spring pressed plunger 41 is provided which is housed in a recess 42 in the valve and is normally projected outwardly by means of a spring 43 located behind said plunger. In operation this plunger either fills the transverse recess 40 or engages the rope located in such recess. The plunger 41 is provided with an elongated slot 44 for the reception of a pin 45 for maintaining the plunger in the valve.

It will be readily understood from the above that the objects above mentioned are readily attained and that our device is a step forward in this particular art, and it will be obvious to those skilled in the art that various changes may be made in our device without departing from the spirit of the invention, and we, therefore, do not limit ourselves to what is shown in the drawings, and described in the specification but only as set forth in the appended claims.

Having thus fully described our said invention, what we claim as new and desire to secure by said Letters Patent, is:

1. A device of the class described comprising a casing, aligned openings in said casing, a lateral opening at the side of the casing, a substantially yoke-shaped valve body pivotally mounted in said casing and movable to a position to close any one of said openings, a recess in one edge of the valve body for receiving a tool suspending cable, and a spring pressed plunger in said valve body normally closing said recess but yieldable to permit the cable to enter the recess.

2. In a device of the class described, a valve mounted to oscillate, a transverse cable receiving passage at one end of the valve, and a spring pressed plunger closing said passage yieldable to permit the reception of the cable in said passage.

3. A device of the class described comprising a casing, aligned openings in said casing, a lateral opening at the side of the casing, a substantially yoke-shape valved body pivotally mounted in said casing and movable to a position to close any one of said openings, a recess in one edge of the valve body for receiving a tool suspending cable, and means normally closing said recess.

4. A device of the class described comprising a casing, aligned openings in said casing, a lateral opening at the side of the casing, a substantially yoke-shaped valve body pivotally mounted in said casing and movable to a position to close any one of said openings, a recess in one edge of the valve body for receiving a tool suspending cable, and means normally closing said recess and operable by engagement of the cable therewith to permit said cable to enter said recess.

5. In a device of the class described, a valve mounted to oscillate, a transverse cable receiving recess at one end of the valve, and means normally closing said recess and operable by engagement of the rope therewith to permit said rope to enter said recess.

In testimony whereof we affix our signatures.

FRANK CARROLL.
WILBUR COSS.